W. R. EDWARDS.
TRACTION DEVICE FOR VEHICLE WHEELS.
APPLICATION FILED DEC. 8, 1915.

1,199,677. Patented Sept. 26, 1916.

Witnesses
E. Q. Rulphrd
P. M. Smith

Inventor
W. R. Edwards
By Victor J. Evans
Attorney

UNITED STATES PATENT OFFICE.

WALLACE R. EDWARDS, OF RED OAK, IOWA.

TRACTION DEVICE FOR VEHICLE-WHEELS.

1,199,677.

Specification of Letters Patent.

Patented Sept. 26, 1916.

Application filed December 8, 1915. Serial No. 65,820.

*To all whom it may concern:*

Be it known that I, WALLACE R. EDWARDS, a citizen of the United States, residing at Red Oak, in the county of Montgomery and State of Iowa, have invented new and useful Improvements in Traction Devices for Vehicle-Wheels, of which the following is a specification.

This invention relates to traction devices for vehicle wheels, the object in view being to provide a device which is readily applicable to the side of a vehicle wheel and particularly a wheel such as is used in the construction of automobiles and carrying a pneumatic tire, the said device embodying in connection with a series of channel arms extending outwardly from a hub embracing collar, a corresponding series of traction spikes or members which are adjustable inwardly and outwardly in relation to the center of the wheel and longitudinally of the channel arms, whereby greater or less projection of the ends of the traction members beyond the tread surface of the tire may be obtained, means being provided whereby the traction arms are clamped to certain spokes of the wheel and also means whereby the traction members or spikes are securely held in their adjusted relation to the channel arms.

With the above and other objects in view, the invention consists in the novel construction, combination and arrangement of parts, as herein described, illustrated and claimed.

Figure 1:
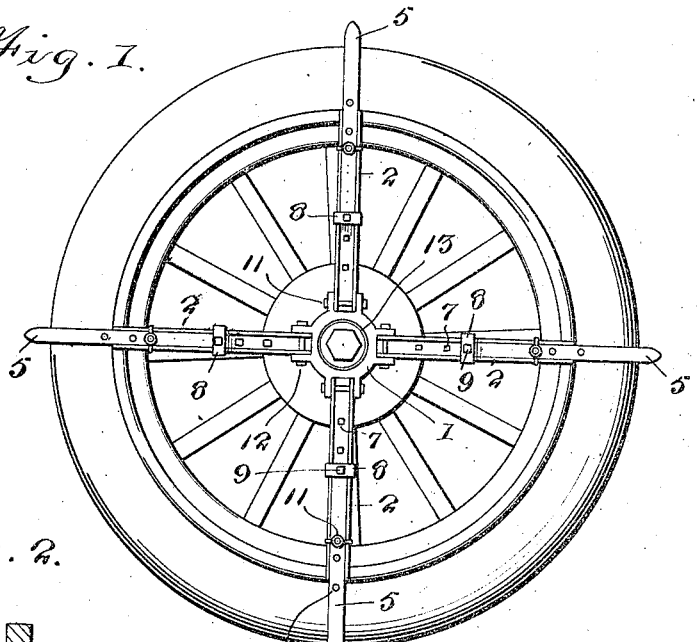
Figure 2:
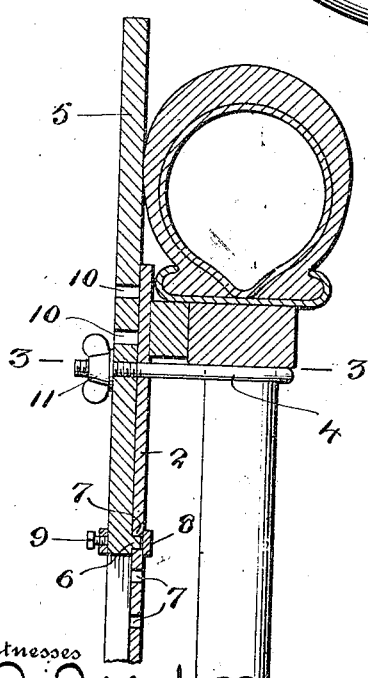
Figure 3:
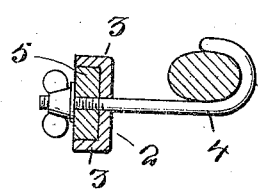

In the accompanying drawings:—Figure 1 is a side elevation of a wheel showing the traction device of this invention applied thereto. Fig. 2 is an enlarged cross section taken radially of the wheel, showing the relation of one of the arms of the device thereto. Fig. 3 is a cross section on the line 3—3 of Fig. 2.

The traction device contemplated in this invention embodies a hub-embracing collar 1 from which radiate a series of arms 2 each consisting of channel iron, the flanges 3 thereof being disposed outwardly or away from the side of the wheel as shown. Clamps 4 are provided for fastening the arms 2 to the adjacent spokes, near the outer ends thereof, thereby securely anchoring the arms of the spokes of the wheel.

In connection with each of the channel arms 2 I employ a traction member or spike 5 of the proper width to fit between the flanges 3 of the channel arm 2. Each traction spike 5 is preferably pointed at its outer extremity so as to penetrate and engage the road surface and is provided at its inner end with a laterally extending tongue or projection 6 adapted to be entered in any one of a longitudinal series of holes 7 formed in the base of the channel arm 2. Any desired number of holes 7 may be provided for the purpose of allowing the spikes 5 to project to a greater or less extent beyond the tread surface of the tire, also enabling the spike to be retracted to an extent which will prevent the outer extremity thereof from contacting with the ground. Any suitable means such as is indicated at 8 may be employed for maintaining the spike 5 in its fixed position and retaining the tongue or projection 6 in the desired hole 7. The traction members 5 are laterally applicable to and removable from the arms 2.

From the foregoing description, taken in connection with the accompanying drawings, it will now be understood that the device as a whole may be quickly applied to a vehicle wheel by placing the collar 1 around the hub of the wheel and then clamping the arms 2 to the spokes. The traction spikes or members 5 are then adjusted to give the required amount of projection. The spikes 5 prevent the car from skidding laterally and also impart the necessary tractive properties to the wheel to enable the same to obtain a firm hold on soft or slippery road surfaces. This adds greatly to the safety of the occupants of the vehicle and enables the vehicle to be extricated from soft places in the road. It also avoids the necessity of racing and overheating the engine and also dispenses with the necessity of using tire chains which are injurious to a pneumatic tire.

The device 8 is shown in the form of a collar surrounding the channeled arm 3 and the respective spike 5, the same being retained in its normal position by means of a set screw 9. By loosening said set screw, the member 8 may be slipped off the end of the spike 7 so as to admit of the adjustment of said spike. The spike 5 is also preferably formed with a series of holes 10 through which the threaded end of the clamp or hook 4 is inserted as shown in Figs. 2 and 3, the parts being held in fixed relation by means of a nut 11.

The arms 2 are preferably connected pivotally to the hub-embracing member or collar 1 by means of bolts 12 or their equivalent.

to permit the arms 1 to be swung outwardly whenever required and also to adapt the whole device to be compactly folded so that it may be carried in a motor car. It is also preferred to line the hub-embracing member 1 with suitable padding material as shown at 13 to prevent marring the paint or finish of the hub of the wheel.

Having thus described my invention, I claim:—

1. A traction device for vehicle wheels comprising a central hub-embracing collar, arms of channel iron extending radially outward from and pivotally attached to said collar and each provided with a longitudinal series of holes, traction members adjustable longitudinally of said arms, each of said traction members being provided with a lateral projection or tongue adapted to be inserted through any one of the holes in the respective arm, and clamping means for holding said arms and traction members in fixed relation to the wheel.

2. A traction device for vehicle wheels comprising a central hub-embracing collar, arms extending radially outward from said collar and each formed with a longitudinal channel in its outer face and provided with a longitudinal series of holes intersecting the floor of the channel, and traction members lying in and adjustable longitudinally of the channels of said arms and laterally removable therefrom, each of said traction members being provided with a projection or tongue adapted to be inserted in any one of the holes in the respective arm, means for clamping said arms to the spokes, and a clamp embracing each traction member and the respective arm.

In testimony whereof I affix my signature in presence of two witnesses.

WALLACE R. EDWARDS.

Witnesses:
    W. C. RATCLIFF,
    J. R. JONES.